(12) United States Patent
Masuyama

(10) Patent No.: US 7,199,823 B2
(45) Date of Patent: Apr. 3, 2007

(54) METHOD AND APPARATUS FOR IMPROVING LIVE VIEW PERFORMANCE OF AN IMAGE PICKUP APPARATUS FOR A MICROSCOPE

(75) Inventor: Hideyuki Masuyama, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 876 days.

(21) Appl. No.: 10/170,529

(22) Filed: Jun. 13, 2002

(65) Prior Publication Data

US 2002/0191086 A1    Dec. 19, 2002

(30) Foreign Application Priority Data

Jun. 18, 2001  (JP) ............................ 2001-183738
Nov. 28, 2001  (JP) ............................ 2001-362794

(51) Int. Cl.
H04N 5/235    (2006.01)
G03B 7/00    (2006.01)

(52) U.S. Cl. ..................... 348/229.1; 348/362

(58) Field of Classification Search ............ 348/221.1, 348/229.1, 362, 333.01, 333.11; 396/432
See application file for complete search history.

(56) References Cited

U.S. PATENT DOCUMENTS

| | | | |
|---|---|---|---|
| 5,831,676 A | | 11/1998 | Takahashi et al. |
| 5,933,513 A | * | 8/1999 | Yoneyama et al. ......... 382/106 |
| 6,452,625 B1 | * | 9/2002 | Kapitza ....................... 348/80 |
| 6,505,004 B2 | * | 1/2003 | Kojima et al. .............. 396/432 |
| 6,795,238 B2 | * | 9/2004 | Masuyama .................. 359/368 |
| 6,876,399 B1 | * | 4/2005 | Masuyama et al. ......... 348/649 |
| 6,970,198 B1 | * | 11/2005 | Schinner et al. ........ 348/333.01 |
| 2003/0016301 A1 | * | 1/2003 | Aizaki et al. ............... 348/345 |

FOREIGN PATENT DOCUMENTS

| | | |
|---|---|---|
| DE | 691 14 875 T2 | 7/1996 |
| JP | 11-164191 | 6/1999 |
| JP | 2000-358189 | 12/2000 |
| WO | WO 00/03283 A2 | 1/2000 |

* cited by examiner

Primary Examiner—Vivek Srivastava
Assistant Examiner—Kelly Jerabek
(74) Attorney, Agent, or Firm—Frishauf, Holtz, Goodman & Chick, P.C.

(57) ABSTRACT

There is disclosed an image pickup apparatus for a microscope, comprising a photometry section for acquiring a photometry value corresponding to a brightness of an observed image, an exposure calculation section for calculating a reference exposure time based on the photometry value acquired by the photometry section, and an exposure control section for controlling exposure in accordance with the reference exposure time, the exposure control section comprising an exposure control section for display for controlling exposure, when the image is displayed in a display section, and an exposure control section for recording for controlling the exposure, when the image is recorded in a recording section.

4 Claims, 6 Drawing Sheets

METHOD AND APPARATUS FOR IMPROVING LIVE VIEW PERFORMANCE OF AN IMAGE PICKUP APPARATUS FOR A MICROSCOPE

CROSS-REFERENCE TO RELATED APPLICATIONS

This application is based upon and claims the benefit of priority from the prior Japanese Patent Applications No. 2001-183738, filed Jun. 18, 2001; and No. 2001-362794, filed Nov. 28, 2001, the entire contents of both of which are incorporated herein by reference.

BACKGROUND OF THE INVENTION

1. Field of the Invention

The present invention relates to an image pickup apparatus and method for picking up an observed image obtained by a microscope.

2. Description of the Related Art

An image pickup apparatus for a microscope has been used in which an observed image of the microscope is picked up by image pickup part such as a CCD. For the image pickup apparatus for the microscope, there have heretofore been proposed techniques for obtaining a desired observed image without impairing operability in framing and focusing even under various photographing conditions.

One of the techniques is for use in photographing a dark sample.

When the observed image obtained by the microscope is recorded as a still image, a moving image is usually displayed in a display section for a framing or focusing operation. The image is picked up for an exposure time determined in accordance with brightness of the sample to observe, so that the moving image is displayed with a desired brightness. Therefore, when the observed sample is dark, the exposure time is lengthened so as to obtain an image with the desired brightness.

However, when the exposure time is lengthened in order to pick up the image of the dark sample, a frame rate for obtaining the moving image lowers. Therefore, the operability in framing or focusing is remarkably impaired.

Then, an apparatus disclosed, for example, in Jpn. Pat. Appln. KOKAI Publication No. 11-164191 is known as an image pickup apparatus which is used for photographing the dark sample, that is, a dark subject. In this apparatus, exposure is controlled as follows.

First, an illuminance of the subject is measured. Photometry evaluation values calculated based on the illuminance are compared with predetermined threshold values A to E. Here, A>B>C>D>E. When the photometry evaluation value is not less than the threshold value A, a gain of an amplifier of an image pickup signal is fixed to G0, a diaphragm and exposure time are changed, and an exposure control of an image pickup element is performed. When the photometry evaluation value is less than the threshold value A, the exposure time is fixed to 1/60 second, and an output from the image pickup element is amplified with a predetermined gain. The gain is determined in accordance with a relation between the photometry evaluation value and the threshold value. For example, the gain is G1, when the photometry evaluation value is not less than B and less than A. The gain is G2, when the evaluation value is not less than C and less than B.

According to the method, even when the sample is dark, the frame rate is not impaired. So the operability in framing or focusing is improved.

However, in this method, the brightness of the moving image changes in stages, because a plurality of predetermined gains are used. Therefore, the moving image cannot be displayed constantly with the desired brightness regardless of the brightness of the sample. Moreover, when the photometry evaluation value is less than the threshold value A, the exposure time is fixed at 1/60 second. Therefore, normally, for the subject requiring an exposure time of about one second, since the gain becomes too large, a noise is also amplified with a large gain, image quality is remarkably deteriorated and it becomes difficult to observe the subject.

Moreover, another technique relates to a method for an observer to obtain an intended exposure.

When the observed image obtained by the microscope is recorded as the still image, the exposure control is performed by a closed loop so as to obtain an appropriate level of an image signal. As a result, an optimum exposure time is automatically set. Moreover, an exposure correction value can be set in accordance with a user's preference. In this case, a control set point level is corrected to a level corresponding to the set exposure correction value, and the optimum exposure time is set by the above-described exposure control.

Additionally, the exposure is corrected such that the correction value is added so as to increase the exposure time. In this case, when the corrected control set point level is not less than a predetermined value, the image signal in the closed loop sometimes exceeds a full range. Then, since an image signal level is saturated, and the optimum exposure time cannot be set, the exposure correction intended by a user cannot be performed. Moreover, the correction is performed such that the correction value is subtracted so as to decrease the exposure time. In this case, when the control set point level after the correction is not more than the predetermined value, the level of the image signal lowers and therefore signal-to-noise ratio is deteriorated. As a result, the controlled image quality sometimes lowers.

As a technique for solving the problem, a method disclosed in Jpn. Pat. Appln. KOKAI Publication No. 2000-358189 is known. This method comprises: calculating the optimum exposure time based on the image obtained from the image pickup element; and controlling the exposure in the exposure time. Moreover, when the exposure correction is set, the calculated exposure time is corrected based on the exposure correction value.

According to the method, since the calculated exposure time is corrected in accordance with the exposure correction value, the exposure can be prevented from being influenced by saturation of the image signal in the correction for increasing the correction value, or by a drop of the S/N of the image signal in the correction for decreasing the correction value.

However, this exposure control method is applied, when the image is obtained as the still image. Therefore, for the moving image continuously taken in order to perform the framing or focusing operation, the exposure correction cannot function.

BRIEF SUMMARY OF THE INVENTION

An object of the present invention is to provide an improved image pickup apparatus for a microscope.

According to a major aspect of the present invention, there is provided an image pickup apparatus applied to a microscope characterized by comprising: an image pickup part configured to pick up an observed image obtained by the microscope; an amplifier section configured to amplify an output from the image pickup part; a display section configured to display an image amplified by the amplifier section and processed by an image processing; a recording section configured to record the image amplified by the amplifier section and processed by the image processing; a photometry part configured to acquire a photometry value in accordance with brightness of the observed image; an exposure calculation part configured to calculate a reference exposure time based on the photometry value acquired by the photometry part; and an exposure control part configured to control exposure in accordance with the reference exposure time, exposure control part comprising: a first exposure control part configured to control the exposure, when the image is displayed in the display section; and a second exposure control part configured to control the exposure, when the image is recorded in the recording section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described hereinafter with reference to the drawings.

Figure 1:
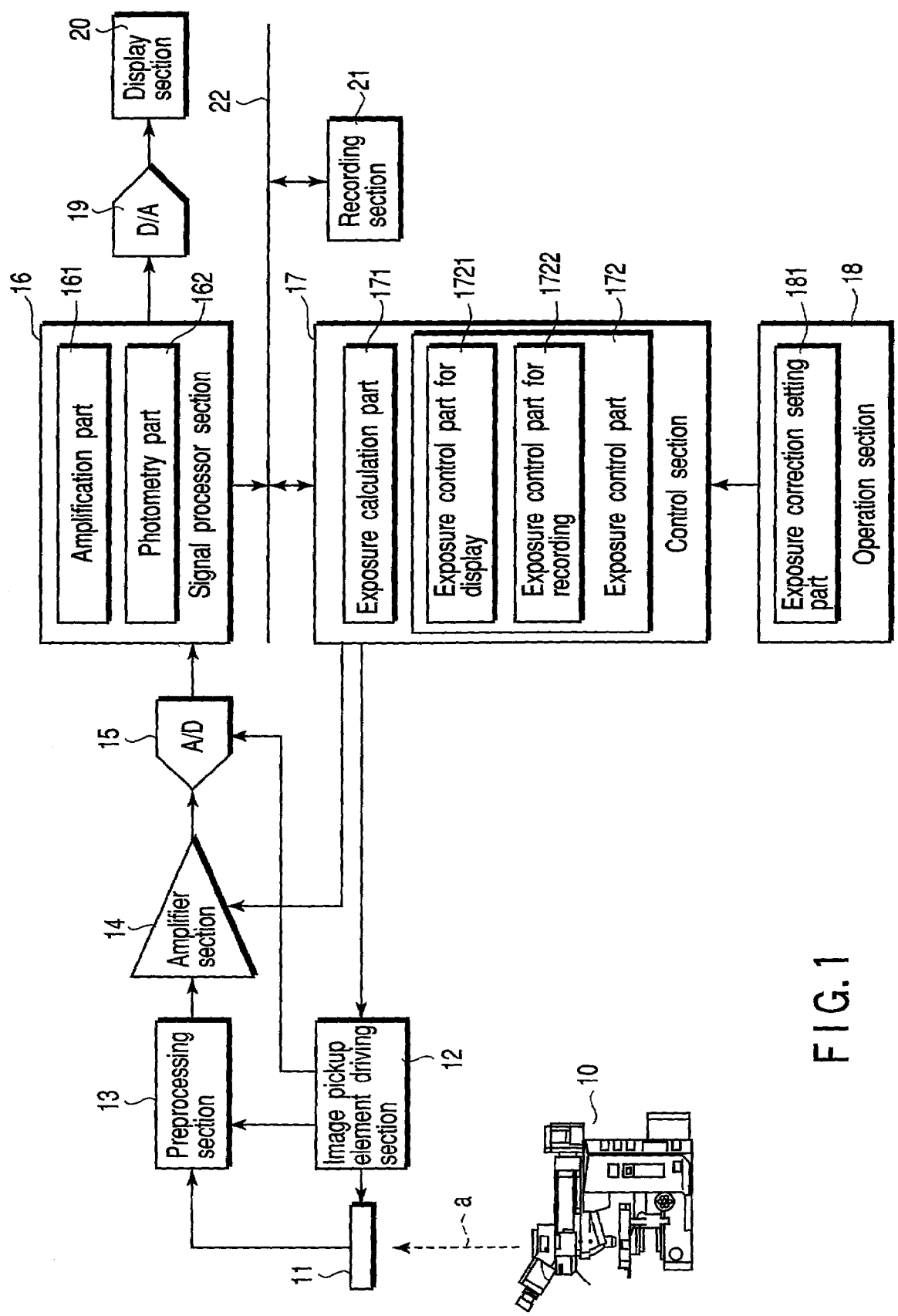
FIG. 1 is a diagram showing a schematic constitution of an image pickup apparatus for a microscope to which a first embodiment of the present invention is applied.

FIG. 1 is a diagram showing a schematic constitution of an image pickup apparatus for a microscope to which the present invention is applied.

For a microscope main body 10, an observed image of a sample (not shown) can visually be observed, and the observed image is derived to the outside along an observation light path a.

In a position on the observation light path a in which the observed image from the microscope main body 10 is projected, an image pickup element 11 such as a CCD is disposed as image pickup part.

The image pickup element 11 is driven by a driving signal from an image pickup element driving section 12, and the observed image is photographed in a predetermined exposure time. Moreover, an image pickup signal obtained by photoelectrically converting the observed image is outputted to a preprocessing section 13. The preprocessing section 13 converts the image pickup signal from the image pickup element 11 into an image signal and inputs the signal to an amplifier section 14 in response to a control signal given from the image pickup element driving section 12.

The amplifier section 14 amplifies the image pickup signal from the preprocessing section 13 with a gain set by a control section 17 and outputs the signal to an analog-to-digital converter section 15. The analog-to-digital converter section 15 converts the image signal from the amplifier section 14 to a digital signal based on a clock signal from the image pickup element driving section 12.

The image signal digitized by the analog-to-digital converter section 15 is inputted into a signal processor section 16. The signal processor section 16 includes an amplification part 161 and a photometry part 162, in addition to a part configured to perform a usual signal processing (not shown) such as color correction and gradation correction with respect to the image signal. The amplification part 161 amplifies the image signal with the gain set by the control section 17 described later. The photometry part 162 performs, for example, a processing of averaging levels of the image signals, and calculates a photometry value corresponding to the brightness of the observed image. Moreover, the photometry part 162 outputs the photometry value to the control section 17 via a bus 22.

An output from the signal processor section 16 is converted to an analog signal by a digital-to-analog converter section 19, and displayed as a moving image in a display section 20.

The control section 17 includes an exposure calculation part 171 and an exposure control part 172. The exposure calculation part 171 calculates an exposure time of the image pickup element 11 based on the photometry value calculated by the photometry part 162. The exposure control part 172 controls exposure based on a calculation result in the exposure calculation part 171. The exposure control part 172 includes an exposure control part for display 1721 configured to perform the exposure control in displaying the moving image in the display section 20, and an exposure control part for recording 1722 configured to perform the exposure control in recording the still image in a recording section 21.

Moreover, the control section 17 receives an output from an operation section 18. The operation section 18 includes an exposure correction setting part 181, and outputs a set exposure correction amount to the exposure calculation part 171. Furthermore, the operation section 18 also includes a function of instructing the control section 17 to control the recording of the still image.

When the moving image is displayed in the display section 20, the exposure control part for display 1721 corrects the gain of the amplification part 161 of the signal processor section 16 in accordance with the set exposure correction amount, and controls and keeps the exposure time of the image pickup element 11 to be constant independently of the exposure correction amount. Moreover, to record the still image, the exposure control part for recording 1722 corrects the exposure time based on the set exposure correction amount, and controls and keeps the gain in the amplification part 161 at a predetermined value.

An operation of the first embodiment constituted as described above will next be described.

An object of the first embodiment is to secure a frame rate which does not impair the operability in framing or focusing, even with the dark sample.

Figure 2:
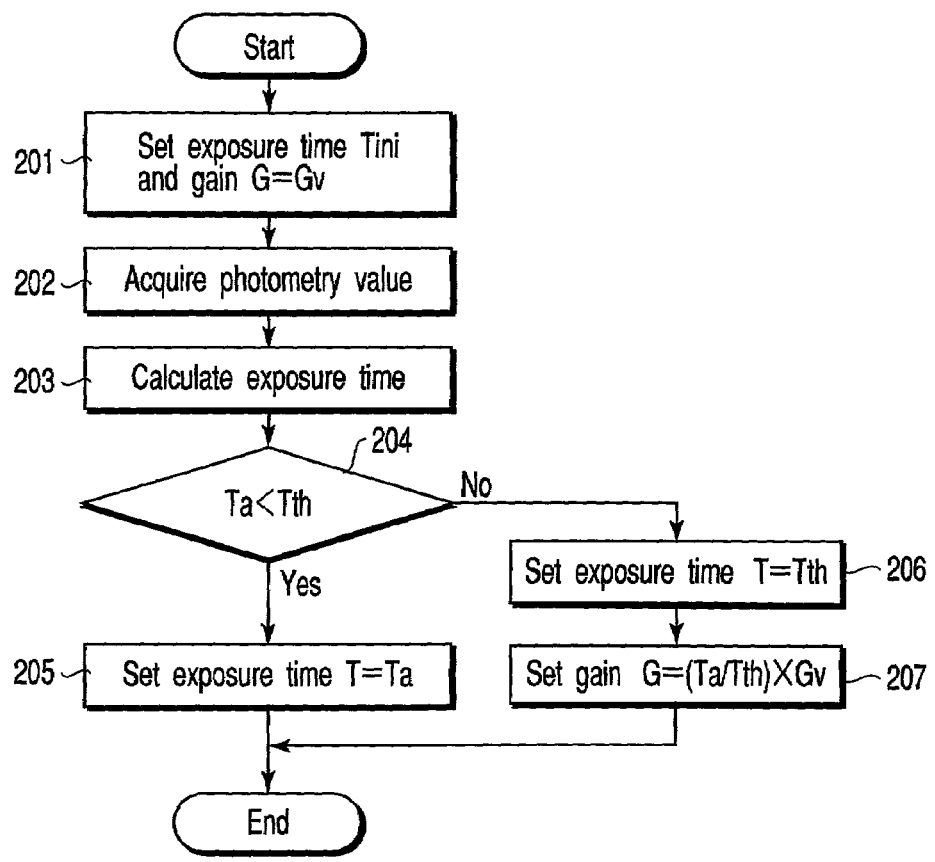
FIG. 2 is a flowchart schematically showing an operation of the image pickup apparatus for the microscope according to the first embodiment.

FIG. 2 is a flowchart schematically showing an operation of the image pickup apparatus for the microscope according to the first embodiment.

In this case, a limit frame rate at which the framing or focusing operation by the moving image is performed is set, for example, to five frames per second. That is, a limit exposure time at which the framing or focusing operation by the moving image is performed is assumed to be set to a limit exposure time Tth of ⅕ second.

In step 201, the control section 17 sets an initial exposure time Tini in the image pickup element driving section 12, and sets a standard gain Gv in the amplifier section 14.

Moreover, when the observed image by the microscope main body 10 is projected on the image pickup element 11, the image pickup element 11 is driven in the initial exposure time Tini based on a driving signal from the image pickup element driving section 12, photoelectrically converts the projected observed image and outputs an electric signal.

The output signal from the image pickup element 11 is inputted into the preprocessing section 13, subjected to a sampling processing in response to the control signal from the image pickup element driving section 12 and formed into an image signal. The image signal is amplified with the gain Gv set beforehand in the amplifier section 14, digitized by the analog-to-digital converter section 15 and inputted into the signal processor section 16.

In step 202, the signal processor section 16 subjects the image signal to a signal processing such as color correction and gradation correction. Moreover, the signal processor section 16 calculates the photometry value from the image signal in accordance with the brightness of the sample, and outputs the value to the control section 17 via the bus 22.

In step 203, the exposure calculation part 171 performs exposure calculation based on the photometry value calculated by the signal processor section 16, and calculates a reference exposure time Ta for obtaining appropriate exposure in a case in which the gain in the amplifier section 14 is Gv.

In step 204, the exposure control part for display 1721 compares the reference exposure time Ta obtained by the exposure calculation with the preset limit exposure time Tth, and sets an exposure time T for displaying the moving image in accordance with a comparison result.

In the step 204, when the sample is bright and the reference exposure time Ta is shorter than the limit exposure time Tth, the processing advances to step 205. In the step 205, the exposure control part for display 1721 holds the gain Gv of the amplifier section 14 as it is, and sets the exposure time T for displaying the moving image as the reference exposure time Ta in the image pickup element driving section 12.

Thereby, the image pickup element driving section 12 drives the image pickup element 11 so that the exposure time is the reference exposure time Ta. In this case, the output from the image pickup element 11 is inputted into the signal processor section 16 via the preprocessing section 13, amplifier section 14, and analog-to-digital converter section 15 similarly as described above. Moreover, the signal is subjected to the color correction and gradation correction in the signal processor section 16, and subsequently displayed as the moving image in the display section 20 via the digital-to-analog converter section 19.

In this case, since the moving image displayed in the display section 20 is taken in the reference exposure time Ta shorter than the limit exposure time Tth, the brightness is appropriate, and the frame rate can be secured without impairing the operability in framing or focusing.

To record this observed image as the still image, an operator operates the operation section 18, and gives a recording instruction to the exposure control part for recording 1722. Then, the observed image is picked up in the reference exposure time Ta by the image pickup element 11, and the image amplified with the gain Gv by the amplifier section 14 is sent and stored in the recording section 21 via the signal processor section 16.

On the other hand, in the comparison result of the reference exposure time Ta with the limit exposure time Tth in the control section 17, when the sample is dark and the reference exposure time Ta is longer than the limit exposure time Tth, the processing advances to step 206. In the step 206, the exposure control part for display 1721 sets the limit exposure time Tth in the image pickup element driving section 12. In step 207, with the change of the exposure time to the limit exposure time Tth, the exposure control part for display 1721 changes the gain of the amplifier section 14 to (Ta/Tth)×Gv.

As a result, the image pickup element driving section 12 drives the image pickup element 11 so as to set the exposure time to the limit exposure time Tth. The output from the image pickup element 11 is formed into the image signal via the preprocessing section 13 similarly as described above, and amplified with a gain (Ta/Tth)×Gv in the amplifier section 14. In the gain of the amplifier section 14, a correction obtained by the change to the limit exposure time Tth is considered. Therefore, the image signal is outputted from the amplifier section 14 with the same brightness as that of the signal obtained by driving the image pickup element 11 in the reference exposure time Ta and amplifying the signal with the gain Gv.

The output of the amplifier section 14 is digitized by the analog-to-digital converter section 15, and inputted into the signal processor section 16. Moreover, the output of the amplifier section 14 is subjected to the color or gradation correction, and subsequently displayed as the moving image in the display section 20 via the digital-to-analog converter section 19.

The moving image displayed in the display section 20 is an image picked up in the limit exposure time Tth, but the gain of the amplifier section 14 is set to (Ta/Tth)×Gv, and the correction obtained by setting the exposure time to the limit exposure time Tth is considered. Therefore, the moving image displayed in the display section 20 is an image having the same brightness as that of the image obtained by driving the image pickup element 11 in the reference exposure time Ta and amplifying the signal with the gain Gv. As a result, the brightness of the moving image is an appropriate brightness. Furthermore, since the exposure time is the limit exposure time Tth, the operability in framing or focusing is not impaired.

Figure 3:
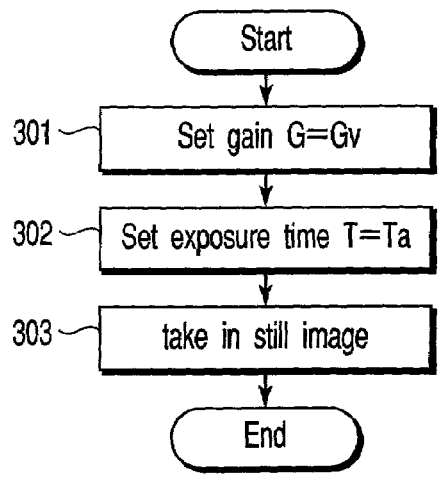
FIG. 3 is a flowchart showing an operation of recording an observed image as a still image.

To record this observed image as the still image, the operator operates the operation section 18 and instructs the exposure control part for recording 1722 to record the image. Then, a flowchart of FIG. 3 showing an operation of recording the observed image as the still image is executed. In steps 301, 302, the exposure control part for recording 1722 sets the gain Gv in the amplifier section 14, and sets the reference exposure time Ta in the image pickup element driving section 12. Thereby, the image pickup element 11 picks up the observed image in the reference exposure time Ta. In step 303, the still image amplified by the amplifier section 14 with the gain Gv is sent and stored into the recording section 21 via the signal processor section 16.

Figure 4:
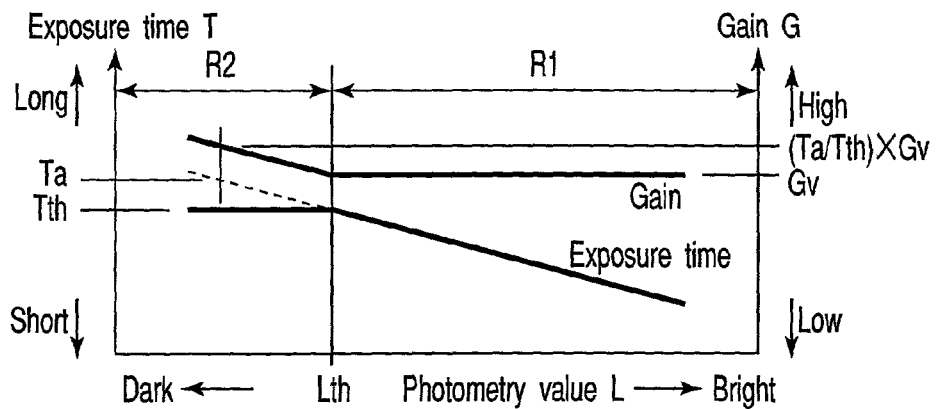
FIG. 4 is a diagram showing a relation between an exposure time and gain with respect to a photometry value corresponding to brightness of a sample.

FIG. 4 is a diagram showing a relation between the exposure time T and gain G with respect to a photometry value L corresponding to the brightness of the sample. Since the sample is sufficiently bright and the photometry value L is not less than Lth in a region R1, the reference exposure time Ta obtained from this photometry value L is shorter than the predetermined limit exposure time Tth. In the region R1, the gain Gv of the amplifier section 14 is held to be constant, the reference exposure time Ta is set in the image pickup element driving section 12 and the observed image is picked up. On the other hand, in a region R2, since the sample is dark and the photometry value L is not more than Lth, the reference exposure time Ta obtained from this photometry value L is longer than the limit exposure time Tth. In the region R2, the limit exposure time Tth is set in the image pickup element driving section 12, the gain of the amplifier section 14 is corrected to (Ta/Tth)×Gv and the observed image is picked up.

Therefore, even when the sample is dark, the moving image displayed in the display section 20 before the recording of the still image is picked up by the image pickup element 11 in the limit exposure time Tth, amplified with the gain (Ta/Tth)×Gv in the amplifier section 14, and therefore displayed with an appropriate brightness. Moreover, the frame rate can accordingly be secured which does not impair the operability in framing or focusing.

In the first embodiment, since the limit exposure time Tth is set to 1/5 second, it is unnecessary to change the gain Gv of the amplifier section 14 even with the sample having a 1/12 brightness as compared with a conventional art having the exposure time set to 1/60 second. As a result, even when the sample is dark, a noise increase with an increase of the gain Gv can be suppressed, and the observation of the sample can securely be prevented from being hindered by the deterioration of signal-to-noise ratio.

Moreover, since the gain set in the amplifier section 14 is obtained by a ratio of the reference exposure time Ta to the limit exposure time Tth, the gain can continuously be set, and the moving image constantly having the appropriate brightness can be displayed irrespective of the brightness of the sample.

On the other hand, when the operator gives the recording instruction from the operation section 18, the amplifier section 14 is set to the standard gain Gv, and the image pickup element driving section 12 is set to the reference exposure time Ta. Thereby, since the observed image picked up by the image pickup element 11 can be recorded as the still image in the recording section 21, the still image faithful to the brightness of the sample can be recorded/stored.

Additionally, the exposure control in the above-described embodiment is an automatic exposure in which the reference exposure time Ta is calculated from the photometry value corresponding to the brightness of the sample, but the exposure may manually be controlled. For example, when the operator sets a desired exposure time Tb with respect to the control section 17 from the operation section 18, the exposure control part for display 1721 compares the set exposure time Tb with the limit exposure time Tth. Moreover, the exposure control is performed in a procedure similar to the above-described procedure. In this case, with Tb larger than Tth, the exposure time is set to the limit exposure time Tth, and the gain of the amplifier section 14 is set to (Tb/Tth)×Gv, so that the exposure control for displaying the moving image may be performed.

A second embodiment of the present invention will next be described.

Figure 5:
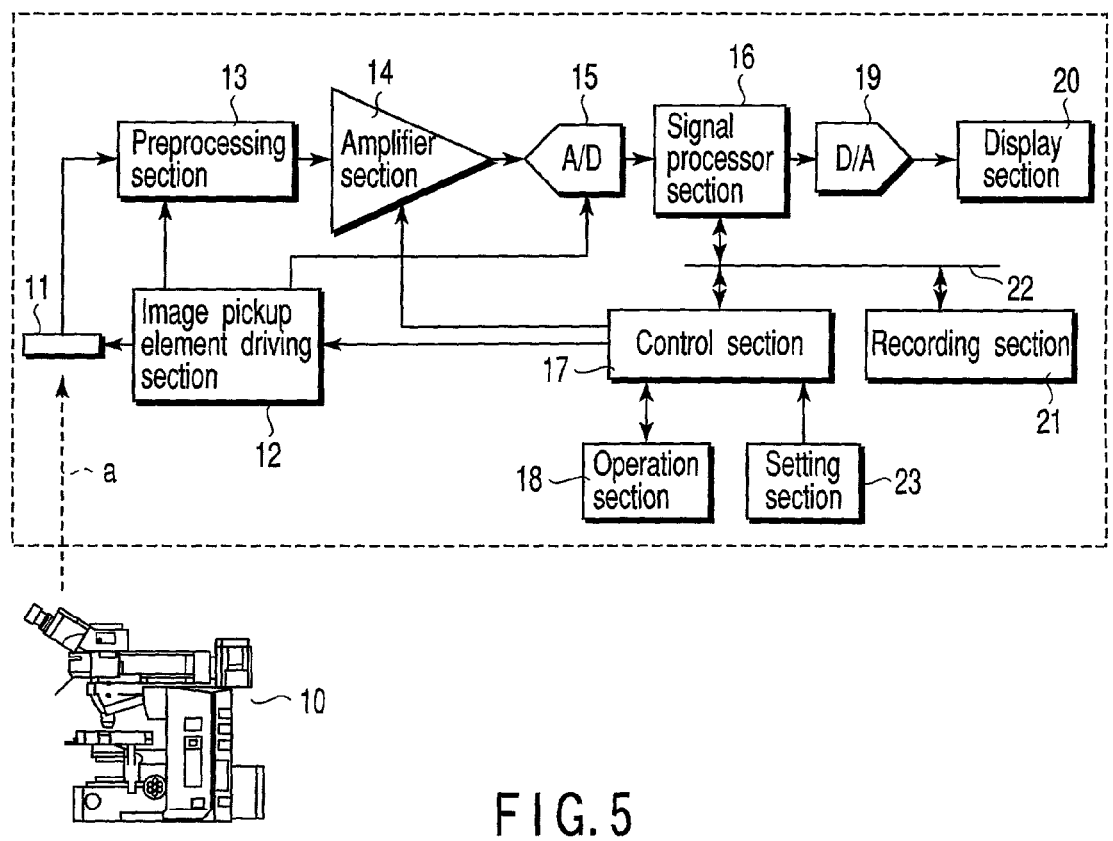
FIG. 5 is a diagram showing a schematic constitution of the image pickup apparatus for the microscope to which a second embodiment of the present invention is applied.

FIG. 5 is a diagram showing a schematic constitution of the second embodiment of the present invention. The same parts as those of FIG. 1 are denoted with the same reference numerals.

In the second embodiment, the control section 17 is connected to a setting section 23. The operator can arbitrarily set a limit frame rate for performing the framing or focusing operation from the setting section 23. The control section 17 obtains an inverse number of the limit frame rate set by the setting section 23, and sets the number as the limit exposure time Tth.

The moving image displayed in the display section 20 in the second embodiment is subjected to the processing similar to that of the first embodiment, except that the limit exposure time Tth based on the frame rate arbitrarily set by the operator is used as a threshold value. Therefore, even with the brightness of the sample such that the reference exposure time longer than the limit exposure time Tth is required, the display with an appropriate brightness can be performed. Moreover, the frame rate desired by the operator can be secured which does not impair the operability in framing or focusing.

A third embodiment of the present invention will next be described.

Figure 6:
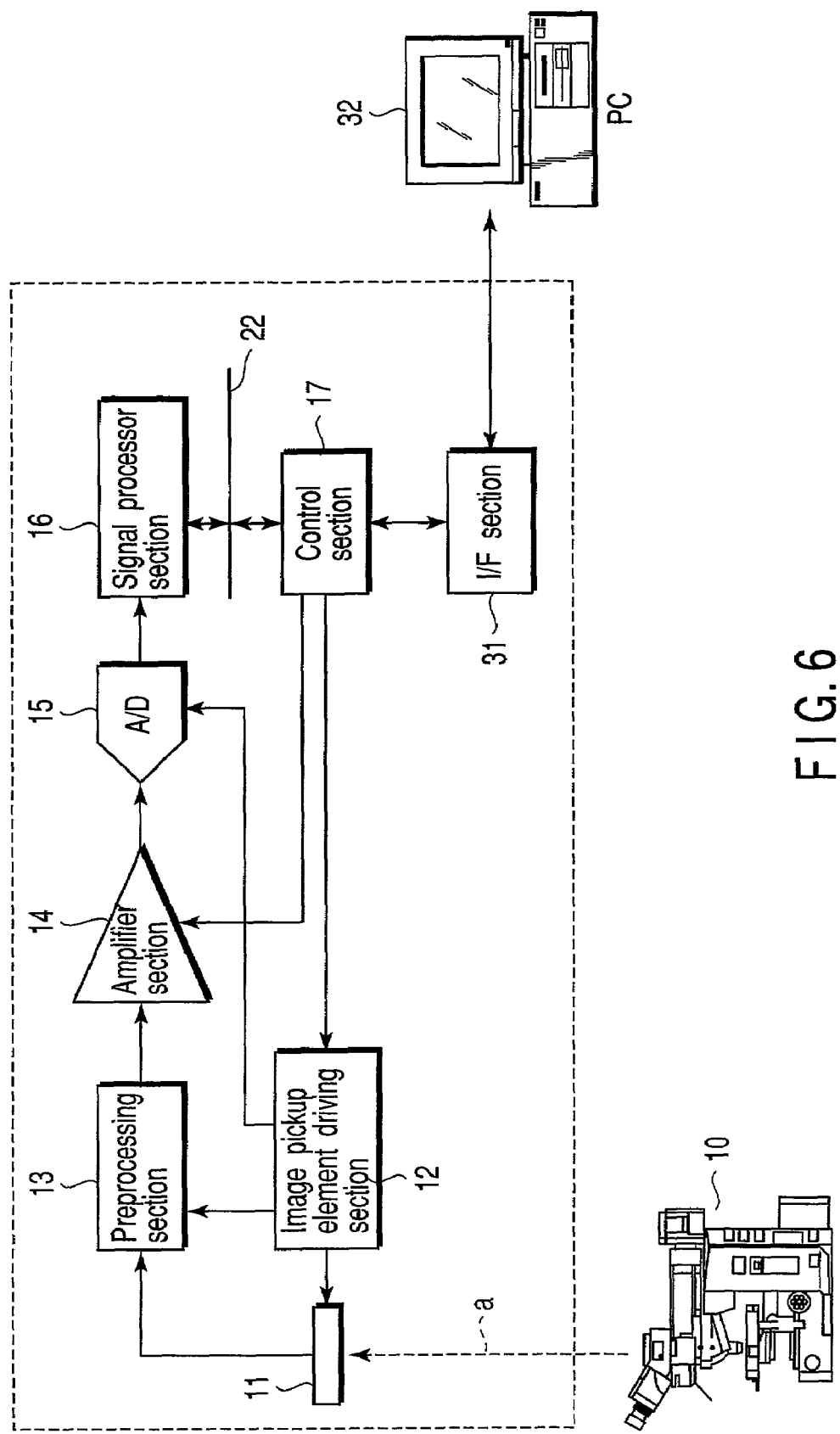
FIG. 6 is a diagram showing a schematic constitution of the image pickup apparatus for the microscope to which a third embodiment of the present invention is applied.

FIG. 6 is a diagram showing a schematic constitution of the third embodiment of the present invention. The same parts as those of FIG. 1 are denoted with the same reference numerals.

The control section 17 is connected to a personal computer (PC) 32 via an interface section 31. This PC 32 has functions of the display section 20, recording section 21, and operation section 18 shown in FIG. 1.

In the third embodiment, the observed image is picked up by the image pickup element 11, the image signal subjected to the color or gradation correction via the preprocessing section 13, amplifier section 14, analog-to-digital converter section 15, and signal processor section 16 is inputted to the control section 17, and the image signal is then outputted to the PC 32 from the control section 17 via the interface section 31. The PC 32 displays this moving image in a monitor of the PC 32.

The moving image displayed in the monitor of the PC 32 is an image obtained by a processing similar to that described in the first embodiment. Therefore, even with the brightness of the sample such that the reference exposure time longer than the limit exposure time Tth is required, the display with the appropriate brightness can be performed by the operation described with reference to the flowchart shown in FIG. 2. Furthermore, the frame rate which does not impair the operability in framing or focusing can be secured.

To record the observed image as the still image, the operator instructs the recording with a mouse or keyboard (not shown) of the PC 32. This instruction is outputted to the control section 17 via the interface section 31. Similarly as the operation described in the first embodiment, the image signal picked up by the image pickup element 11 is inputted to the PC 32 from the signal processor section 16 via the interface section 31 by the control section 17, and stored in a recording medium (not shown) such as a hard disk drive of the PC 32.

Additionally, in the third embodiment, similarly as the first embodiment, the control section 17 performs the exposure calculation. However, the control section 17 may input the photometry value from the signal processor section 16 to the PC 32 via the interface section 31, and the PC 32 may perform the exposure calculation, and send the reference exposure time Ta to the control section 17 via the interface section 31.

An operation of the image pickup apparatus for the microscope according to a fourth embodiment of the present invention constituted as shown in FIG. 1 will next be described. The fourth embodiment is similar to FIG. 1 in the constitution of the present invention, but the operation is different. In the fourth embodiment, an arbitrary exposure correction can be set with respect to the moving image, and a stable exposure precision is obtained.

Figure 7:
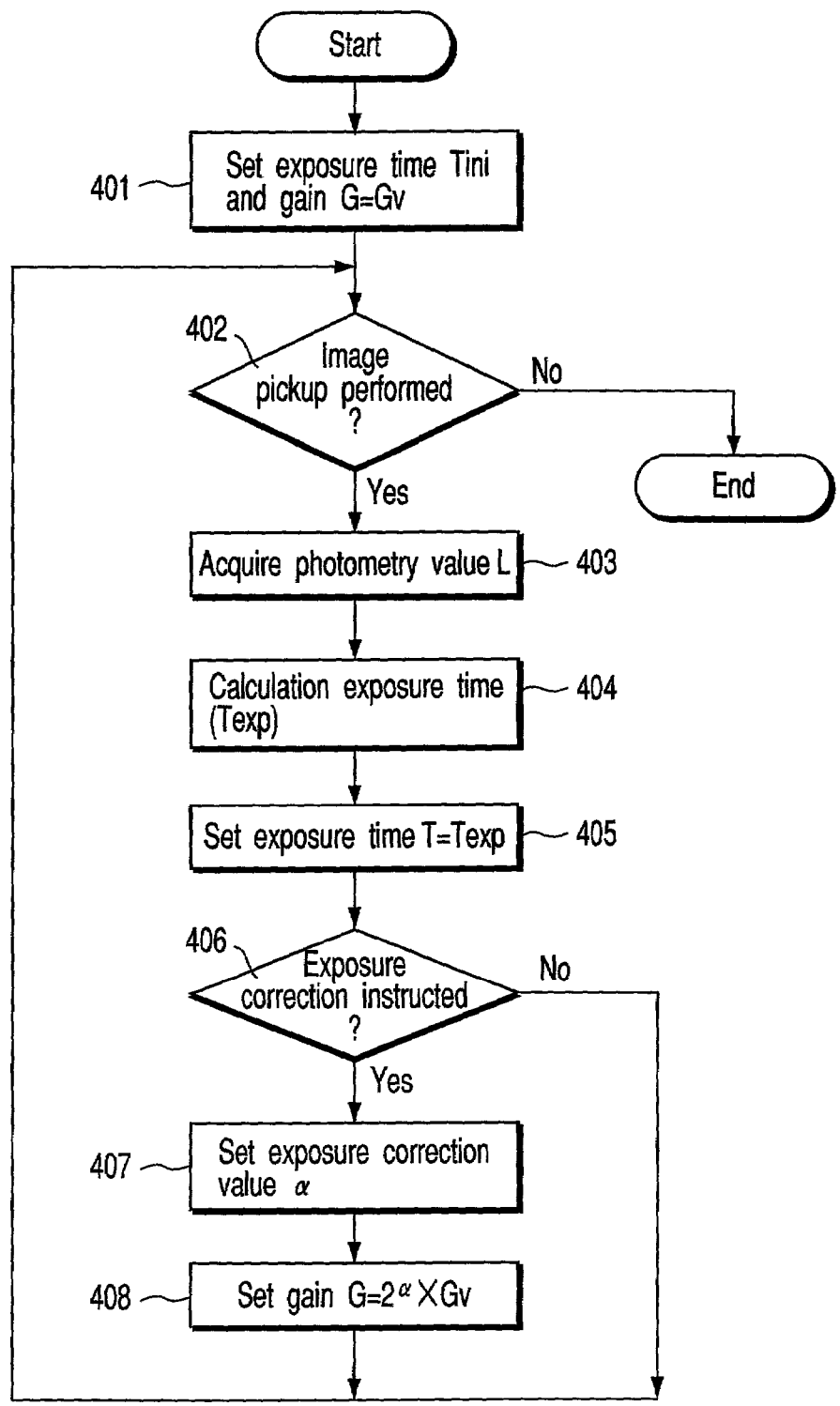
FIG. 7 is a flowchart schematically showing the operation of the image pickup apparatus for the microscope according to a fourth embodiment.

FIG. 7 is a flowchart schematically showing the operation of the image pickup apparatus for the microscope according to the fourth embodiment.

In step 401, the exposure control part for display 1721 sets the initial exposure time Tini as the exposure time in the image pickup element driving section 12. Moreover, the exposure control part for display 1721 sets the standard gain Gv in the amplification part 161 of the signal processor section 16.

Next in step 402, the control section 17 judges whether or not the image pickup element 11 picks up the image. When the image pickup element 11 picks up the image in the step 402, that is, when the observed image of the microscope main body 10 is projected on the image pickup element 11, the image pickup element 11 is driven in the initial exposure time Tini based on the driving signal from the image pickup element driving section 12. Moreover, the observed image projected on the image pickup element 11 is photoelectrically converted and outputted as the electric signal.

The output signal from the image pickup element 11 is given to the preprocessing section 13, subjected to a sampling processing by the control signal given from the image pickup element driving section 12 and converted to the image signal. Subsequently, the image signal is digitized and inputted into the signal processor section 16 via the analog-to-digital converter section 15, and amplified with the standard gain Gv preset in the amplification part 161.

The signal processor section 16 subjects the image signal to the signal processing such as the color correction and gradation correction. Moreover, the output subjected to the signal processing is converted into the analog signal by the digital-to-analog converter section 19 and displayed as the observed image in the display section 20. In this case, the observed image displayed in the display section 20 is a moving image for performing the framing or focusing operation before taking in the still image.

From this state, in step 403, the signal processor section 16 takes the image signal from the analog-to-digital converter section 15 into the photometry part 162. Subsequently, the photometry part 162 averages the image signal, calculates the photometry value L corresponding to the brightness of the observed image, and outputs the value to the exposure calculation part 171 via the bus 22.

In steps 404 and 405, the exposure calculation part 171 compares the acquired photometry value L with a target exposure value Lref having a preset appropriate exposure level. Subsequently, an exposure time Texp is calculated such that the photometry value L is within an error range ΔL from the target exposure value Lref. Moreover, the exposure control part for display 1721 sets the exposure time Texp in the image pickup element driving section 12.

The image pickup element driving section 12 outputs a driving pulse corresponding to the set exposure time Texp to the image pickup element 11. The observed image on the observation light path a of the microscope main body 10 is picked up in the exposure time Texp by the image pickup element 11. Moreover, the picked up observed image is displayed in the display section 20 via the signal processor section 16 and digital-to-analog converter section 19.

When the user desires to correct the exposure level to the arbitrary level in step 406, and when the operation section 18 instructs the exposure control part for display 1721 to correct the exposure, the processing advances to step 407. In the step 407, the user sees the moving image displayed in the display section 20 and sets an exposure correction value α by the exposure correction setting part 181. In this case, the exposure correction value α can be set in a range of −n stages to +m stages. Additionally, n and m are integers, but do not have to be mutually different integers, and may have a relation n=m.

In step 408, the exposure control part for display 1721 sets a gain $G=2^{\alpha} \times Gv$ obtained by multiplying Gv by a coefficient corresponding to the exposure correction value α in the amplification part 161 of the signal processor section 16. For example, when the exposure correction value α is +1 stage, a gain of $G=2 \times Gv$ is set.

Here, since the photometry value L is calculated based on the image signal before the exposure correction, the exposure time Texp calculated from the comparison result with the target exposure value Lref is not influenced by the exposure correction value α. That is, the exposure time Texp determined by the exposure control part for display 1721 is controlled irrespective of the exposure correction value α. Thereby, the image pickup element 11 is driven in the exposure time Texp regardless of the exposure correction value α.

On the other hand, the signal processor section 16 amplifies the image signal with the gain $2^{\alpha} \times Gv$ set in the amplification part 161, subjects the signal to the signal processing such as a color processing and gradation correction, and displays the signal in the display section 20 via the digital-to-analog converter section 19.

Thereby, the display section 20 displays the image signal amplified with the gain $G=2^{\alpha} \times Gv$ set in accordance with the exposure correction value α as the moving image with respect to the image signal from the image pickup element 11 picked up in the exposure time Texp.

Therefore, the user can arbitrarily determine the preferable exposure correction value α while seeing the moving image displayed in the display section 20.

Thereafter, when the control section 17 judges the end of the image pickup in the image pickup element 11 in the step 402, all the processing ends.

Figure 8:
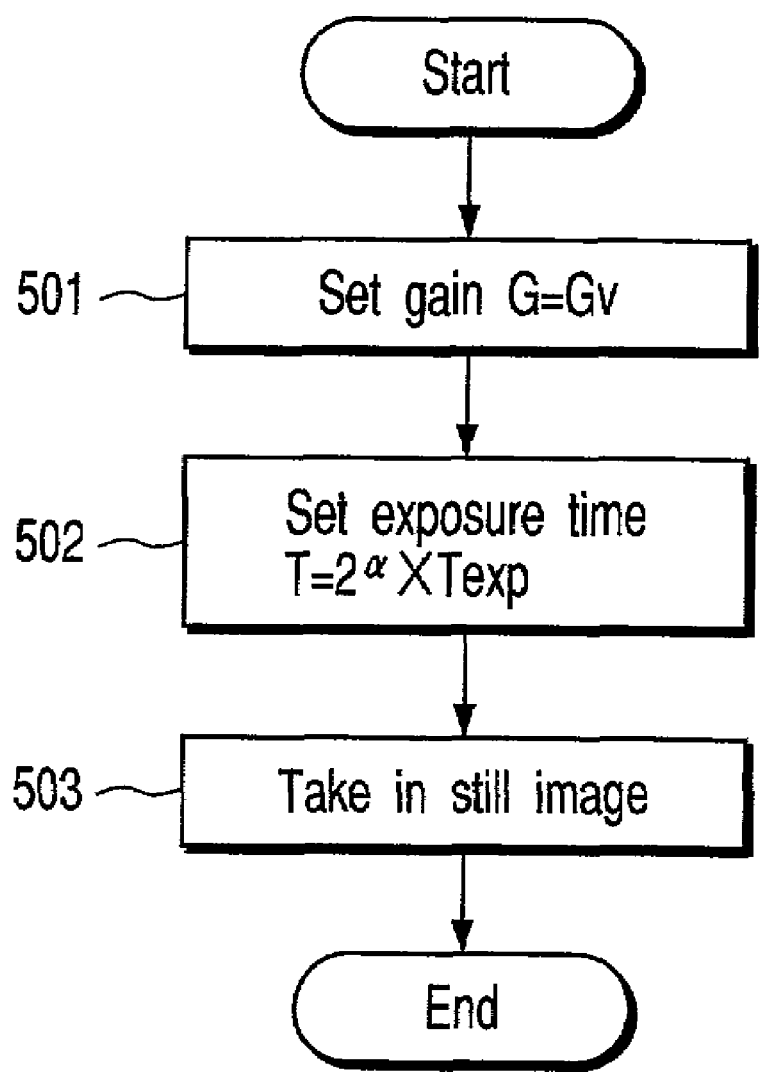
FIG. 8 is a flowchart showing an operation of recording the observed image being observed as the still image.

Subsequently, to record the image displayed in the display section 20, that is, the image being observed as the still image, the user inputs a recording instruction of the still image into the exposure control part for recording 1722 by the operation section 18. This executes a flowchart shown in FIG. 8.

In step 501, the exposure control part for recording 1722 sets the initial gain Gv with respect to the amplification part 161 of the signal processor section 16. Subsequently, in step 502, the exposure control part for recording 1722 sets an exposure time $2\alpha \times$Texp obtained by multiplying the exposure time Texp by the coefficient corresponding to the exposure correction value α in the image pickup element driving section 12. In step 503, the control section 17 inputs the image signal picked up by the image pickup element 11 in the recording section 21 from the signal processor section 16 via the bus 22, and records the signal as the still image. Thereby, the image signal picked up in the exposure time 2α×Texp corrected in accordance with the exposure correction value α is recorded in the recording section 21.

In the fourth embodiment, to correct the exposure level of the moving image displayed in the display section 20, the exposure control part for display 1721 controls the exposure time Texp determined by the exposure calculation part 171 regardless of the exposure correction value α and in accordance with the comparison result of the photometry value L with the target exposure value Lref as the appropriate exposure level, and corrects the gain in the amplification part 161 by the amount corresponding to the exposure correction value α. Therefore, the image pickup element 11 is driven in the exposure time Texp regardless of the exposure correction value α. For example, to perform the correction for increasing the exposure time, a problem that a more appropriate exposure time cannot be obtained because of saturation of the photometry value L is solved. Moreover, to perform the correction for decreasing the exposure time, a problem that the precision of the exposure time Texp is not stabilized because of the influence of a noise generated from the drop of the photometry value L can also be solved. As a result, a constantly stable exposure precision can be maintained.

Moreover, the exposure control part for display 1721 sets the exposure time Texp to a time calculated irrespective of the exposure correction value α, and corrects the gain of the amplification part 161 in accordance with the exposure correction value α, so that the moving image exposed/corrected as desired by the user can be displayed in the display section 20. As a result, in a state of the moving image constantly exposed/corrected to be optimum, the framing or focusing operation can be performed before acquiring the still image.

A fifth embodiment of the present invention will next be described.

A constitution of the fifth embodiment of the present invention is similar to the constitution of the third embodiment, and shown in FIG. 6.

The control section 17 is connected to the personal computer (PC) 32 via the interface section 31. The PC 32 has the functions of the display section 20, recording section 21 and operation section 18.

In this constitution, the control section 17 inputs the image signal subjected to the color correction or gradation correction into the PC 32 from the signal processor section 16 via the interface section 31. The PC 32 displays the image signal inputted via the interface section 31 as the moving image in the monitor. In this state, when the user sets the exposure correction value α by operating the mouse or keyboard (not shown) of the PC 32, similarly as the processing described in the fourth embodiment, the monitor of the PC 32 displays the image signal amplified by the gain $G=2^{\alpha} \times Gv$ set in accordance with the exposure correction value α with respect to the image signal of the image pickup element 11 picked up in the exposure time Texp as the moving image.

Therefore, also in this case, the user can determine the favorable exposure correction value α while seeing the image displayed in the monitor of the PC 32.

Moreover, to record this observed image as the still image, the user inputs the instruction for recording the still image by the mouse or keyboard of the PC 32. The recording instruction is inputted into the control section 17 via the interface section 31. Similarly as described in the fourth embodiment, the control section 17 sets the initial gain Gv with respect to the amplification part 161 of the signal processor section 16, and sets the exposure time 2α×Texp in the image pickup element driving section 12 by the exposure control part 172. Moreover, the image signal picked up by the image pickup element 11 is inputted into the PC 32 from the signal processor section 16 via the interface section 31, and recorded as the still image in the recording medium (not shown) such as the hard disk drive of the PC 32.

Additionally, in the fifth embodiment, the control section 17 determines the exposure time similarly as the fourth embodiment, but the present invention is not limited to the fourth embodiment. The control section 17 inputs the photometry value L from the signal processor section 16 into the PC 32 via the interface section 31, and the PC 32 may perform the exposure calculation, obtain the reference exposure time Texp, gain G or exposure time $2^{\alpha} \times$Texp corresponding to the exposure correction value α, and send the value to the control section 17 via the interface section 31.

Even with this constitution, the effect similar to that described in the fourth embodiment can be expected.

Additionally, the present invention is not limited to the above-described embodiments, and can variously be modified in a range of the unchanged scope in an implementation stage. For example, the embodiment of the present invention has a constitution including both the amplifier section 14 and the amplification part 161, but the first embodiment may be constituted to include only the amplifier section 14, and the fourth embodiment may be constituted to include only the amplification part 161.

What is claimed is:

1. An image pickup apparatus applied to a microscope, comprising:
   an image pickup part configured to pick up an observed image obtained by the microscope;
   an amplifier section configured to amplify an output from said image pickup part;
   a display section configured to display an image which is amplified by said amplifier section and processed by an image processing;
   a recording section configured to record the image amplified by said amplifier section and processed by the image processing;
   a photometry part configured to acquire a photometry value in accordance with a brightness of the observed image;
   an exposure calculation part configured to calculate a reference exposure time based on the photometry value acquired by said photometry part; and
   an exposure control part configured to control exposure in accordance with the reference exposure time, by controlling an actual exposure time of the image pickup part and a gain of the amplifier section;
   wherein said exposure control part comprises:
      a first exposure control part configured to control the exposure in a first mode, when the image is displayed by said display section, wherein when the reference exposure time is longer than a limit exposure time said first exposure control part sets the limit exposure time to said image pickup part as the actual exposure time, and sets the gain of said amplifier section, and wherein the gain is obtained by multiplying a ratio of the reference exposure time to the limit exposure time by a standard gain of said amplifier section; and a second exposure control part configured to control the exposure in a second mode, when the image is recorded in said recording section, wherein said second exposure control part sets the reference exposure time to said image pickup part as the actual exposure time, and sets the standard gain to said amplifier section.

2. The image pickup apparatus for the microscope according to claim 1, wherein the limit exposure time is set arbitrarily.

3. An image pickup method for an image pickup apparatus applied to a microscope, wherein the image pickup apparatus comprises an image pickup part configured to pick up an observed image obtained by the microscope, an amplifier section configured to amplify an output from said image pickup part, a display section configured to display an image which is amplified by said amplifier section and processed by an image processing, and a recording section configured to record the image amplified by said amplifier section and processed by the image processing, said image pickup method comprising:

acquiring a photometry value in accordance with a brightness of the observed image;

calculating a reference exposure time based on the acquired photometry value;

controlling exposure by a first exposure control method, by controlling an actual exposure time of the image pickup part and a gain of the amplifier section, when the image is displayed by said display section; and controlling the exposure by a second exposure control method, by controlling the actual exposure time of the image pickup part and the gain of the amplifier section, when the image is recorded in said recording section;

wherein when the reference exposure time is longer than a limit exposure time said first exposure control method comprises:

setting the limit exposure time to said image pickup part as the actual exposure time; and setting the gain of said amplifier section, wherein the gain is obtained by multiplying a ratio of the reference exposure time to said limit exposure time by a standard gain of said amplifier section; and wherein said second exposure control method comprises:

setting the reference exposure time to said image pickup part as the actual exposure time; and setting the standard gain to said amplifier section.

4. The image pickup method according to claim 3, wherein the limit exposure time is set arbitrarily.

* * * * *